(12) United States Patent
Caretti et al.

(10) Patent No.: US 9,313,672 B2
(45) Date of Patent: Apr. 12, 2016

(54) METHOD FOR COORDINATED TRANSMISSION IN A PLURALITY OF CELLS OF A WIRELESS COMMUNICATION SYSTEM

(75) Inventors: Marco Caretti, Turin (IT); Valeria D'Amico, Turin (IT); Bruno Melis, Turin (IT); Dario Sabella, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 111 days.

(21) Appl. No.: 13/995,831

(22) PCT Filed: Dec. 20, 2010

(86) PCT No.: PCT/EP2010/007782
§ 371 (c)(1),
(2), (4) Date: Jun. 19, 2013

(87) PCT Pub. No.: WO2012/083973
PCT Pub. Date: Jun. 28, 2012

(65) Prior Publication Data
US 2013/0301422 A1 Nov. 14, 2013

(51) Int. Cl.
*H04W 24/02* (2009.01)
*H04B 1/10* (2006.01)
*H04B 7/02* (2006.01)
*H04W 24/00* (2009.01)
*H04W 24/10* (2009.01)
*H04W 28/04* (2009.01)
*H04W 72/12* (2009.01)

(52) U.S. Cl.
CPC ............ *H04W 24/02* (2013.01); *H04B 1/1027* (2013.01); *H04B 7/022* (2013.01); *H04W 24/00* (2013.01); *H04W 24/10* (2013.01); *H04W 28/048* (2013.01); *H04W 72/12* (2013.01)

(58) Field of Classification Search
CPC ..... H04B 1/1027; H04B 7/022; H04W 24/02; H04W 24/10; H04W 28/048; H04W 72/12
USPC .................................. 370/241, 216, 229, 312
See application file for complete search history.

(56) References Cited

U.S. PATENT DOCUMENTS

| 2010/0130223 | A1* | 5/2010 | Liao et al. ...................... 455/453 |
| 2010/0173660 | A1 | 7/2010 | Liu et al. |
| 2010/0195527 | A1* | 8/2010 | Gorokhov et al. ............. 370/252 |
| 2010/0203887 | A1* | 8/2010 | Kim ............................... 455/434 |

(Continued)

OTHER PUBLICATIONS

3GPP TSG RAN WG2, "Impact of CoMP on Control Plane", Oct. 2009, 3GPP, 3GPP TSG RAN WG2 Meeting #67bis, pages all.*

(Continued)

*Primary Examiner* — Un C Cho
*Assistant Examiner* — Shah Rahman
(74) *Attorney, Agent, or Firm* — Oblon, McClelland, Maier & Neustadt, L.L.P

(57) ABSTRACT

A method for coordinated transmission in a plurality of cells of a wireless communication system, wherein a user equipment triggers coordinate transmission of a plurality of cells if it detects an interference condition between signals received by the plurality of cells, the user equipment detecting the interference condition based on a radio quality metric dynamically set by the network and triggering coordinate transmission by transmitting a trigger signal to at least a cell of the plurality of cells. A radio equipment and a user equipment for use in a wireless communication system can implement coordinated transmission with the method.

27 Claims, 6 Drawing Sheets

(56) References Cited

U.S. PATENT DOCUMENTS

| | | | |
|---|---|---|---|
| 2010/0273444 A1* | 10/2010 | Wu | H04W 4/22 455/404.1 |
| 2010/0323711 A1* | 12/2010 | Damnjanovic et al. | 455/450 |
| 2011/0075611 A1* | 3/2011 | Choi | 370/329 |
| 2011/0134774 A1* | 6/2011 | Pelletier et al. | 370/252 |
| 2011/0269459 A1* | 11/2011 | Koo | H04W 24/10 455/434 |
| 2012/0176996 A1* | 7/2012 | Kim | H04W 72/0413 370/329 |

OTHER PUBLICATIONS

3GPP, "3GPP TR 36.814 V9.0.0", Mar. 2010, 3GPP, Release 9, p. 17.*
Boudreau, Gary et al., "Interference Coordination and Cancellation for 4G Networks", Apr. 2009, IEEE Communications Magazine, pp. 74, 80.*
Karakayali, M. K. et. al, "Network Coordination for Spectrally Efficient Communications in Cellular Systems", Aug. 2006, IEEE Wireless Communications, pp. 56-61.*
CATT, "Impact of CoMP on Control Plane", Jul. 2009, 3GPP, 3GPP TSG RAN WG2 Meeting #66bis R2-093727, pages: All.*
3GPP TSG RAN WG2 Meeting #67bis R2-095488, "Impact of CoMP on Control Plane", CATT, pp. 1-6, (Oct. 12-16, 2009), XP 50390044.
3GPP TSG RAN WG2 Meeting #67 R2-094282, "Discussion of Handover for CoMP", Research in Motion UK Limited, pp. 1-6, (Aug. 24-28, 2009), XP 50352526.
3GPP TSG RAN WG1 Meeting #57 R1-091688, "Potential gain of DL CoMP with joint transmission", NEC Group, Total 5 Pages, (May 4-8, 2009) XP 50339227.
International Search Report Issued Sep. 8, 2011 in PCT/EP10/007782 Filed Dec. 20, 2010.

* cited by examiner

METHOD FOR COORDINATED TRANSMISSION IN A PLURALITY OF CELLS OF A WIRELESS COMMUNICATION SYSTEM

TECHNICAL FIELD

The present invention relates to the field of wireless communication systems and more particularly to multicell coordinated multipoint transmission and reception (CoMP) systems and methods.

In detail, the invention finds preferred application in advanced wireless communication systems like LTE-A (Long Term Evolution-Advanced), wherein use of coordinated transmission techniques are under discussion and evaluation in 3GPP (Third Generation Partnership Project) group. However, the invention is not only limited to wireless communication systems based on OFDM (Orthogonal Frequency Division Multiplexing) like LTE, LTE-A, WiMAX (Worldwide Interoperability for Microwave Access), UMB (Ultra-Mobile Broadband) but it is also applicable in systems that use different radio access techniques like for example CDMA (Code Division Multiple Access).

The invention also relates to equipment for use in such wireless communication systems.

BACKGROUND ART

Inter-cell interference is one of the main factors that limit spectrum efficiency of wireless communication systems, in particular for users located at the cell edge of a cellular system.

In second generation systems, like GSM (Global System for Mobile Communications), inter-cell interference is kept under control by limiting the usage of the frequency resources in the spatial domain by means of a reuse factor larger than one.

In third generation systems, like UMTS (Universal Mobile Communications System), where the frequency reuse factor is unitary, inter-cell interference for cell edge users is mitigated by means of the soft/softer handover technique through connection of a user equipment to a plurality of NodeBs.

In order to solve the problem of the inter-cell interference in Fourth Generation (4G) systems, like LTE-A, it has been recently introduced the concept of Coordinated Multi-Point Transmission and/or reception, also known with the acronym CoMP. The basic idea is to have some form of coordination between the different radio base stations (called eNodeB in LTE-A) in order to limit the inter-cell interference or to turn the interfering signals into useful ones. In the first case data are transmitted only from one transmission point (i.e. the serving cell) and the other cells adapt their transmission in order to reduce the interference over specific time/frequency transmission resources. These schemes are known in the 3GPP terminology as Coordinated Scheduling/Coordinated Beamforming (CS/CB). In the second case data are transmitted to the user from multiple cells so that the interference is turned into a useful signal. This second class of CoMP schemes are denoted as Joint Processing (JP) according to the 3GPP terminology.

Coordination among cells can occur at different levels of the protocol stack: like for example at the physical layer level (L1 coordination), at scheduling level (L2 coordination) or at Radio Resource Management level (L3 coordination). In any case the objective of CoMP is to proactively reduce, or ideally null, the inter-cell interference and thus to provide a uniform QoS (e.g. throughput) for all the served users irrespective of their position within the cell. WO2010/116340 discloses a system and method for reducing inter-cell interference within a CoMP cell (term used to identify a set of eNodeBs serving different cells), wherein the CoMP cell controller gathers scheduling information on adjacent CoMP cells in order to schedule data transmission to user equipments (UEs) within the controlled CoMP cell.

Coordination between cells has clearly a cost represented by the overhead deriving from the exchange of information (data, control and measurements) over the radio interface and over the backhauling links between the cooperating cells.

Patent application WO 2010/036158 provides a user grouping method to tradeoff the CoMP downlink capacity and the required uplink feedback. A channel element, such as the large scale fading, is measured for each distributed transmitter and user equipment (UE) pair based on reference signals, and the network receives this information as feedback in the uplink. The CoMP network determines a maximum cross interference level $\alpha_{req}$ that is affordable, based on the available uplink capacity for feedback. If this maximum cross interference level $\alpha_{req}$ is exceeded, geographically separate UEs are divided into as few groups as possible, with UEs within each group separated, and the groups are allocated different time/frequency resource blocks. The grouping is done with the constraint that the cross interference does not exceed $\alpha_{req}$. This solution does not reduce too much the network overhead due to CoMP, since it requires the network to evaluate if the maximum interference level is exceeded, which means that the network shall receive a huge amount of data (reducing uplink capacity) and shall implement further calculation to implement user grouping.

Moreover, CoMP techniques requires the UE to search and identify cells that are suitable to implement coordinated transmission and reception. This has the drawback of increasing UE complexity (as more hardware for processing and storing is needed) and of stressing battery consumption (as several measurements are required). In order to solve this problem WO2010/039066 discloses a CoMP system wherein a UE is served by several subcells belonging to one serving CoMP cell and wherein common channel signals are identically transmitted by all subcells in a CoMP cell. In this system UE executes cell searching only within target CoMP cells by comparing a CoMP cell quality performance measure with a threshold value that can be provided by the network.

This solution reduces the UE complexity, not the network one, which still suffers of the network overhead provided by coordination of cells/subcells in CoMP systems.

OBJECTS AND SUMMARY OF THE INVENTION

It is an object of the present invention to solve some of the problems of the prior art wireless systems implementing coordinated transmission/reception.

In particular, it is an object of the present invention to present a wireless communication system and a method thereof which allow controlling inter-cell interference while keeping network overhead under control.

It is also an object of the present invention to present a system and a method that allows improving use of network resources.

Another object of the present invention is to provide a CoMP method which allows improving use of network resources with a reduced impact on the user equipment consumption.

These and further objects are achieved by means of a system and a method comprising the features of the annexed claims, which form an integral part of the present invention.

The method provides for reducing inter-cell interference by means of cell coordinated transmission techniques when UE detects a possible interference between signals received from different cells. Detection of this interference condition is made by the UE based on a signal quality metric dynamically defined and transmitted by the network to the UE.

This solution provides the advantage that measures are executed by the UE without overload for the network, but conditions which determine triggering of coordinated transmission are defined by the network and can be defined on a user-per-user/connection-per-connection basis, so as to optimize network resources and control network overhead.

In one aspect of the invention, potentially interfering cells make a first try to coordinate transmission at layer 2 level, in particular by coordinating scheduling. If such coordination is not possible, cells coordinate transmission at physical level, in particular by controlling the emission field of at least an antenna of the cells.

This approach has the advantage that operating at scheduling level (L2) it is possible to maximally exploit the transmitting antennas in order to maximize the diversity order or the degree of spatial multiplexing towards the useful radio link. Conversely when the interference rejection is carried out at physical layer level (L1) the antennas are simultaneously used to transmit over the useful radio link and to minimize the interference towards an interfered UE located in an adjacent cell. In this case then it is not possible to maximize the diversity order or the degree of spatial multiplexing towards the useful radio link.

In another aspect of the invention, measures carried out by the user equipment to detect an interference condition, are provided on the whole transmission band, i.e. on the whole range of frequency which can be transmitted by the access apparatuses. By implementing this type of measures UE gets a good knowledge of the interference situation over the whole transmission band and therefore can provide the network with information useful for improving scheduling.

In a further aspect of the invention, the network provides the user equipment with information on the specific frequency ranges wherein quality measures shall be performed. In particular these frequency ranges are frequency ranges that are currently allocated or that are to be allocated to the user by the serving cell. This provides the advantage of reducing power consumption of the user equipment.

In another aspect, the invention is directed to the equipments that are used to implement the methods of coordinated transmission/reception. In particular, the invention is directed to a radio equipment comprising means for wireless communication with a user equipment (UE) and means for communicating with a second radio equipment suitable to establish wireless communication with said user equipment. The radio equipment according to the invention comprises means for transmitting a radio quality metric, in particular a metric defined on a per-user basis, to the UE for detecting an interference condition. Moreover, the radio equipment according to the invention comprises means for receiving a trigger signal from the user equipment, said trigger signal comprising an identifier of said second radio equipment. Radio equipment is then configured to coordinate transmission with said second radio equipment upon reception of the trigger signal.

In one aspect, the invention is directed to a radio equipment comprising a control unit operatively connected to a receiving unit and to a transmission unit for wireless communication with a user equipment. The radio equipment comprises an interface for communicating with a second radio equipment suitable to establish wireless communication with the same user equipment. The control unit is configured to set a radio quality metric and to transmit said radio quality metric via the transmission means to the user equipment for detecting an interference condition. The control unit is adapted to receive a trigger signal from the user equipment via the receiving unit, said trigger signal comprising an identifier of the second radio equipment. The radio equipment further comprises a data interface, operatively connected to the control unit, for communicating with the second radio equipment, the control unit being adapted to coordinate transmission with the second radio equipment upon reception of the trigger signal.

According to a further aspect, the invention is also directed to a user equipment for use in a wireless communication system. The user equipment comprises means for measuring quality of signals received from a plurality of transmitters of the communication system, and means for transmitting a trigger signal triggering coordinated transmission of at least two transmitters of said plurality of transmitters.

In one aspect, the invention is directed to a user equipment for use in a wireless communication system. The user equipment comprises a measuring unit for measuring quality of signals received from a plurality of radio equipments of the communication system, and a control unit operatively connected to a transmission unit. The control unit is adapted to generate a trigger signal and to transmit it to a radio equipment via the transmission unit, said trigger signal being adapted to trigger coordinated transmission of at least two equipments of said plurality of radio equipments. The control unit is configured to transmit the trigger signal when an interference condition is detected by comparing quality measures performed by the measuring unit with a radio quality metric received from a radio equipment of the wireless communication system.

Further objects and advantages of the present invention will be clear form the following description of preferred non limiting embodiments.

BRIEF DESCRIPTION OF THE DRAWINGS

The invention will be presented here below with reference to non limiting examples, provided for explicative and non limitative reasons in the annexed drawings. These drawings illustrate different aspects and embodiments of the present invention and, where appropriate, reference numerals illustrating like structures, components, materials and/or elements in different figures are indicated by similar reference numbers.

DETAILED DESCRIPTION OF THE INVENTION

Figure 1:
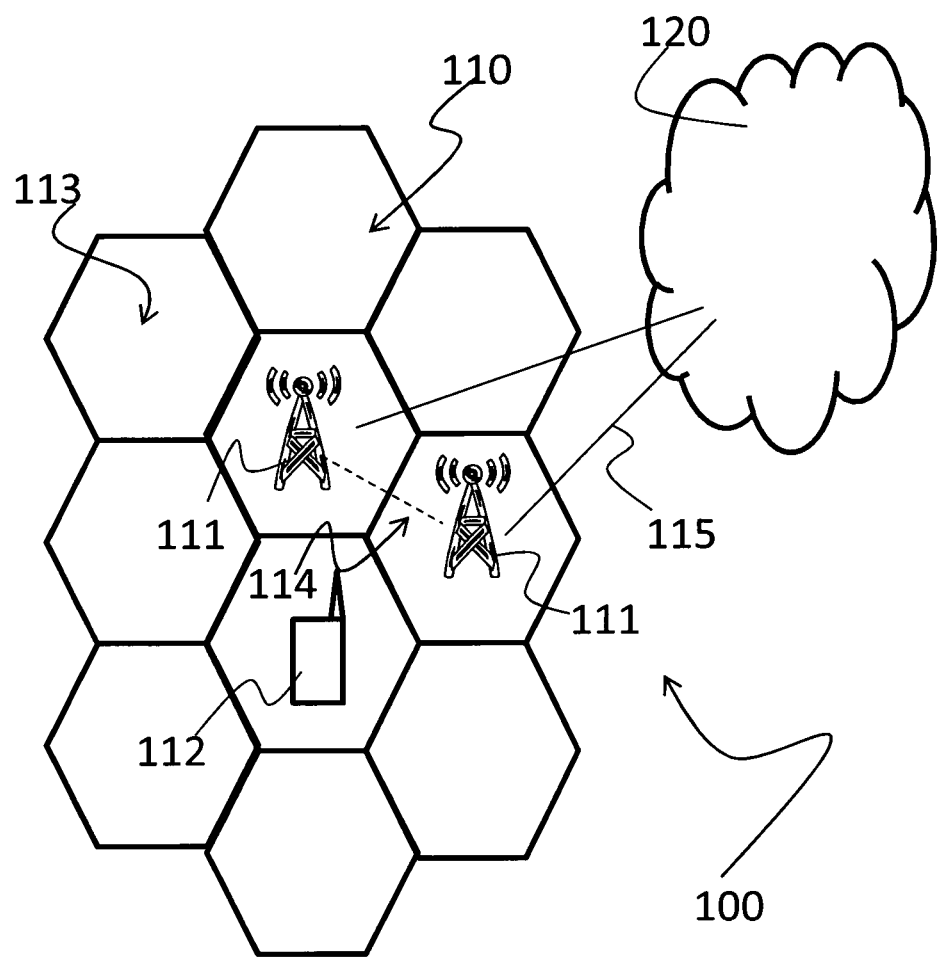
FIG. 1 illustrates a wireless communication system for implementing CoMP.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the scope of the invention as defined in the claims.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

The term "coordination set" will be used to identify the set of transmission points/apparatuses (both geographically separated or co-located) that directly or indirectly participate to the transmission to a given UE.

In FIG. 1 a wireless communication system, in particular a telecommunication network 100 comprising a wireless access subsystem, is schematically disclosed.

Telecommunication network 100 comprises an access subsystem 110 (also named UTRAN or E-UTRAN) and a core network 120.

Access subsystem 110 comprises access apparatuses 111 in wireless communication with user equipments (UEs) 112. In one embodiment, the access subsystem comprises also apparatuses for cable connection of a user equipment to the network.

In the following description telecommunication network 100 is an LTE-A network and access apparatuses 111 are eNodeB apparatuses, nevertheless the invention is not limited to this type of network. As an example network 100 can be an LTE or UMTS or GSM or GPRS or EDGE network. Depending on the type of network, access apparatuses can be of different type and can be interconnected in different ways. These apparatuses therefore are not limited to eNodeBs and can comprise any device suitable to provide a wireless connection to a UE; as an example access apparatuses can comprise access points, radio base stations, remote radio heads (RRH) and radio network controllers controlling the radio base stations.

Access subsystem 110 is divided in cells 113, each cell comprising at least an access apparatus communicating with UEs in a corresponding coverage area. Each access apparatus comprises an equipment and one or more antennas. In case the equipment can receive and transmit signals from different antennas, each cell 113 can be logically divided in a plurality of subcells, each covered by a given antenna controlled by a common equipment. For sake of clarity, the following description will be limited to the case of a network 100 divided in cells with no subcells, nevertheless the invention can be applied to a network comprising subcells wherein coordinated transmission/reception involves coordination of subcells or cells and subcells.

eNodeBs 111 are interconnected with each other via a data interface 114 (indicated in dotted line in FIG. 1) that in LTE is known as X2 interface. X2 interface is based on IP protocol.

eNodeBs 111 are connected via an S1 interface 115 to the core network 120, which comprises server and databases (like Home Location Register) for providing services (like voice calls or VoIP calls) to the users connected via the access subsystem 110. In particular, core network 120 comprises MMEs (Mobility Management Entities) and Gateways for connection with other networks.

In the following description, the term backhauling link will be used to indicate any of links between access apparatuses and between access apparatuses and core network.

In the preferred embodiment, eNodeBs 111 are responsible for all radio-related functions and are programmed to implement coordinated multi point transmission/reception (CoMP), which implies transmitting/receiving signals from/at several transmission/reception points.

In one embodiment, cells 113 are grouped in a plurality of CoMP cells, each one comprising a plurality of neighbouring cells coordinated by a coordinating system that, in the preferred embodiment, is a distributed system comprising different coordinating units connected to or integrated in one or more eNodeBs.

Figure 2:
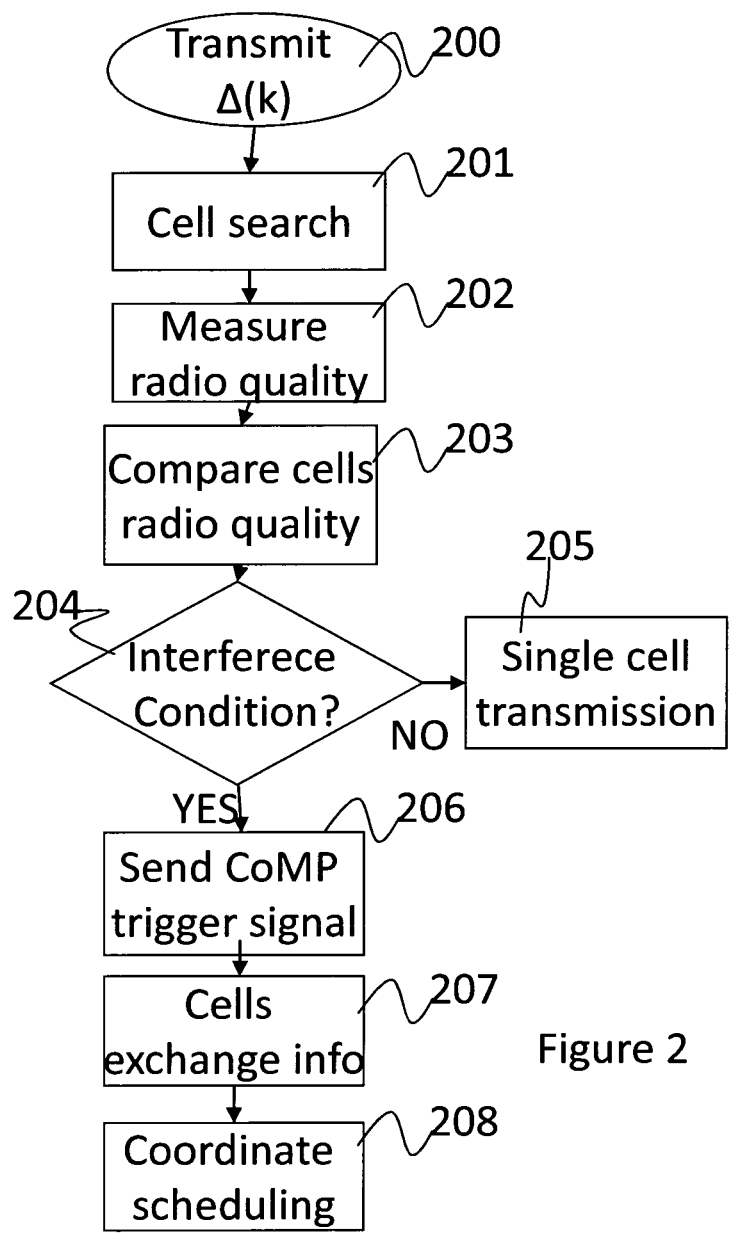
FIG. 2 illustrates a flow diagram of a method for coordinating transmission of a plurality of cells in the communication system of FIG. 1.
Figure 3:
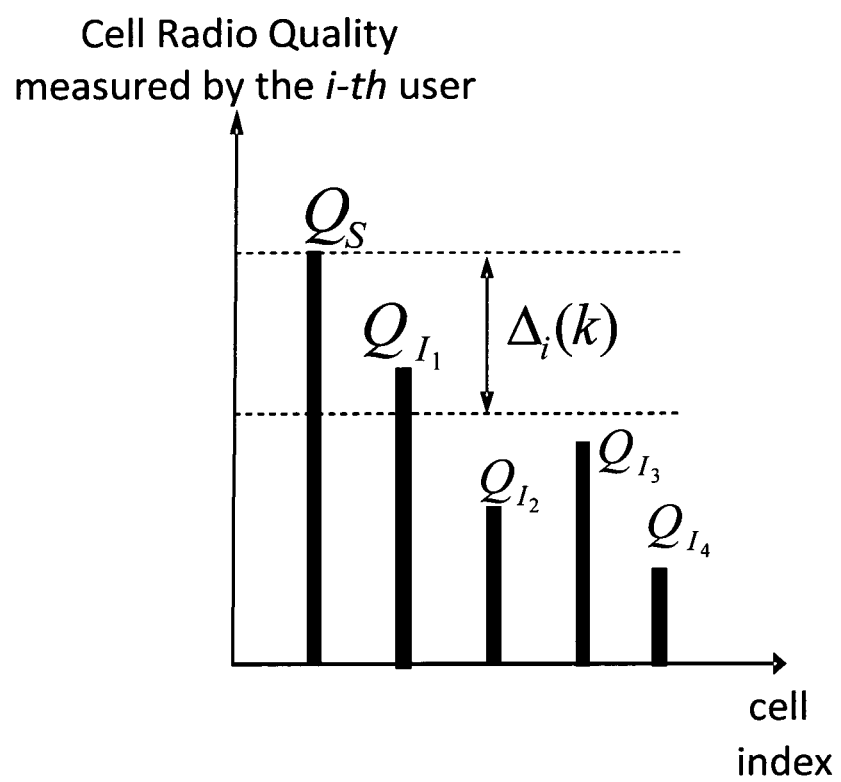
FIG. 3 illustrates cell radio quality measures made by a user equipment in the system of FIG. 1.

Network 100 is adapted to implement the coordinated multi point transmission/reception (CoMP) method hereby disclosed with reference to FIGS. 2 and 3.

At step 200 cell serving UE 112 (e.g. the cell exchanging Radio Resource Control messages) transmits a radio quality metric, in particular a quality threshold $\Delta_t(k)$, to be used by UE 112 to trigger coordinated transmission from different cells, e.g. in order to reduce inter-cell interference experienced by UE 112.

In general, for each user the serving cell sets a threshold that depends on the type of service requested by the UE and/or events that occur in the network and/or the user behaviour.

Different users in the same cell or a same user in different times can therefore be configured with a different value of the threshold.

The threshold can be configured by the network (and particularly by the eNodeB) by means of RRC (Radio Resource Control) signalling during connection establishment or periodically when the connection is already established.

Preferably the threshold is configured for the first time at the call setup (i.e. during connection establishment) and can be subsequently modified by the network through downlink signalling. When in connected mode the UE periodically measures the quality indicator of the serving cell and of the interfering cells that are received above a specified minimum level. Such measures are repeated by the user equipment with a periodicity that can be configured by the network. Alternatively the measures can be triggered by the network at the occurrence of specific events. For example if the network status indicates a low uplink load the base station may command an update of the threshold for a specific user and subsequently trigger the execution of new measures in order to update the size of the cooperation set used by the CoMP scheme.

Preferably, dedicated RRC messages are transferred across SRB (Signalling Radio Bearers, SRB0-SRB2), which are mapped onto the CCCH (Common Control CHannel) and DCCH (Dedicated Control CHannel) logical channels at RLC level. The CCCH channel is used during connection establishment while the DCCH is used in RRC connected mode. The threshold may then be configured through a RRC-ConnectionSetup message at connection setup and subsequently reconfigured through a RRCConnectionReconfiguration message.

In one preferred embodiment, the threshold and the cell radio quality measure to which the threshold refers is specified in the Information Element (IE) ReportConfigEUTRA; this information element is already described in the 3GPP specification TS 36.331, "Radio Resource Control (RRC) Protocol specification" V9.4.0 (2010-09), pages 187-189, but to the purpose of the present invention is modified in order to transport information relating to the threshold and the cell radio quality measure to which the threshold refers.

At step 201 UE 112 carries out a cell search and detects cell identifiers of neighbour cells; detection of cell identifiers is preferably obtained from Primary and Secondary Synchronization Signals broadcast by cells of network 100. In the embodiment hereby described, it is assumed that UE 112 finds four interfering cells.

At step 202 UE 112 measures cell radio quality of the serving cell and of the identified neighbour cells; in particular UE 112 measures the indicator associated to the threshold transmitted by the network at step 200. Such measure is preferably performed by exploiting the Synchronization Signals (SS) or the Reference Signals (RS) transmitted by different cells 113. Some well known examples of such measures are the Reference Signal Received Quality (RSRQ), the Signal to Interference Ratio of Reference Signals (RS SINR) and the Reference Signals Received Power (RSRP). In one embodiment, cell radio quality measures are performed over the whole transmission band and thus are denoted as "wideband". In an alternative embodiment, cell radio quality measures are performed over specific portions of the band denoted as "sub-bands". In order to allow UE 112 to understand which measures to carry out, the serving cell can transmit to the UE the relative information together with the threshold $\Delta_i(k)$.

FIG. 3 shows the cell radio quality (e.g. RSRP, RS SINR, RSRQ, etc.) measured by a UE for the serving cell (Qs) and for four interfering cells ($Q_{I1}, Q_{I2}, Q_{I3}, Q_{I4}$). The threshold set by the network for the i-th user (in this example UE 112) at the time instant k is denoted as $\Delta_i(k)$.

At step 203 UE 112 compares the cell radio quality measured for the different cells in order to detect which cells experience a radio quality that differs less than the quality threshold fixed by the network at step 200.

In formulas the measure performed by the UE 112 can be expressed as follows $$\Delta Q_{S\text{-}I_j} = Q_S - Q_{I_j} \, [dB] \quad (1)$$

where $Q_S$ is the value in decibel (dB) of the quality indicator measured for the serving cell over a given time interval $T_m$ and $Q_{I_j}$ is the value of the quality indicator in dB measured for the j-th interfering cell over the same time interval $T_m$ or over an adjacent time interval in order to be comparable with first measure. The measure described by the equation (1) is preferably done over the sub-bands where UE 112 is allocated on the serving cell.

The quality difference $\Delta Q_{S\text{-}I_j}$ is then compared (step 204) with the threshold $\Delta_i(k)$ expressed in dB and set by the network. In particular UE 112 checks if $$\Delta Q_{S\text{-}I_j} < \Delta_i(k) \quad (2)$$

If for all the interfering cells the difference does not drop below the threshold, UE 112 transmits to the network (step 205) only the measured serving cell's quality and the network serves the UE without any coordinated transmission technique. As an example, if steps 200-204 are taken during connection establishment, and if equation (2) is false, than UE connects to the serving cell and no actions are taken on the interfering cells.

In one embodiment, if the difference drops below the threshold, UE 112 sends (step 206) through uplink signalling at least a CoMP activation bit that informs the network that the interference rejection mechanism must be activated for the interfering cell $I_j$. In one embodiment, this information is conveyed by the UE to the eNodeB by means of a report message, in particular a MeasurementReport message, that is used for reporting the measurement results using the logical DCCH channel at RLC (Radio Link Control) level and/or SRB1 at RRC level. Together with the CoMP activation bit, the UE sends also the cell ID of the interfering cell that is generating the interference, which harms the reception of the UE.

After reception of the CoMP bit, the serving cell exchanges with the interfering cell $I_j$ (step 207) some information in order to start coordinated transmission. In one embodiment, serving cell exchanges with the interfering cell $I_j$ some Layer 2 (L2) control information in order to possibly solve the interfering problem at scheduling level. This exchange of information between the eNodeBs can occur over the X2 interface or the S1 interface (with higher latency). In one embodiment, in order to activate the CoMP, the serving cell shares with the interfering cell the scheduling location (i.e. resource block indexes and subframe indexes) where UE 112 is currently located and where it will be scheduled in the next subframes, if such information is in some way predictable.

In one embodiment, based on this information (step 208) the interfering cell scheduler tries reducing the interference by freeing the related resources and allocating its served user over different subbands. In LTE terminology one subband is formed by a certain number of adjacent PRBs (Physical Resource Blocks) where each PRB is formed by 12 adjacent subcarriers. This coordination scheme is denoted as Dynamic Fractional Frequency Reuse (D-FFR) because the spatial reuse of a given time/frequency resource is determined cooperatively by the different base stations. In a second embodiment, the interfering cell reduces the transmitted power on the signalled transmission resources; this second embodiment is preferred if the interfering cell is serving a central user close to the interfering base station.

Figure 4:
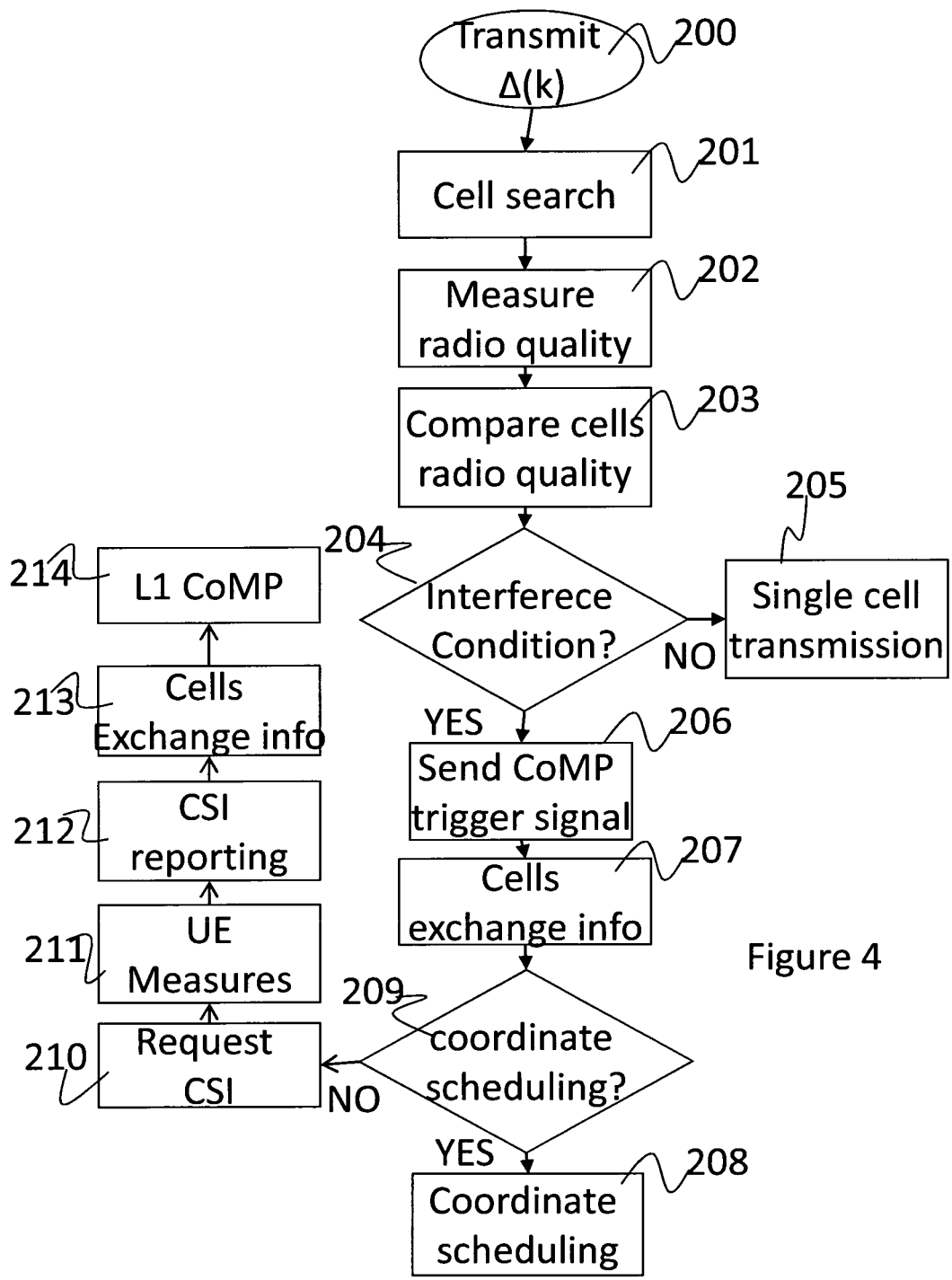
FIG. 4 illustrates a flow diagram of a second embodiment of a method for coordinating transmission of a plurality of cells in the communication system of FIG. 1.

In general the L2 mechanisms described above are preferably applied when the interfering cell load is small and thus the scheduler has sufficient degrees of freedom to manage the interference problem. For this reason in the embodiment of FIG. 4 a decisional step 209 is taken after the serving cell and the interfering cell $I_j$ have exchanged (step 207) information for starting coordinated transmission over UE 112.

At step 209 the method therefore provides for checking if it is possible to reduce interference experienced by UE 112 via a scheduling coordination of the serving and interfering cells.

If such a scheduling coordination is possible, then the methods continues with step 208 as described above with reference to the embodiment of FIG. 2.

If the scheduling constraints make not feasible a solution of the interference problem for the UE at scheduling level, a second level of the interference rejection mechanism is activated. This second level acts at the physical layer level (L1) and requires an exchange of signalling and measures over the uplink of the serving cell and over the backhauling link significantly larger than the size of the information exchanged at the L2 step.

At the second level of the interference rejection mechanism the serving cell commands (step 210) UE 112 (for example through a downlink RRCConnectionReconfiguration message) to perform detailed CSI (Channel State Information) measurements for the radio link between the interfering cell $I_j$ and UE 112. Such request is in general complemented with the indexes of the frequency resources (i.e. subbands) where to perform such measure and where UE 112 will be probably scheduled in the next subframes by the serving cell. In case the message RRCConnectionReconfiguration is used, the Information Element (IE) ReportConfigEUTRA is suitable for specifying the type of CSI measure to be performed by the UE and the related parameters.

After receiving the request to report the CSI, UE 112 makes the necessary measures (step 211) and the reports them to the serving cell (step 212).

The type of CSI reported by the UE can be different depending on the complexity/accuracy trade-off adopted in the considered communication system.

In a first embodiment, UE 112 explicitly reports the CSI. In case of an explicit CSI reporting, a quantized version of the channel matrix $H_{cellj \to UE_i}$ of the radio link between the interfering cell $I_j$ and UE 112 is estimated and reported by UE 112 to the serving cell. This information is then conveyed (step 213) through the backhauling (i.e. the X2 interface) to the interfering cell.

The interfering cell $I_j$ exploits the channel knowledge over the interfering link in order to reduce interference experienced by UE 112 (step 214). In particular, interfering cell $I_j$ computes suitable precoding weights according to the multi-cell coordination scheme implemented in the network. For example in case of a pure multi-cell interference rejection scheme the precoding weights are calculated at the interfering cell $I_j$ in order to place a null in the radiation diagram over the relevant direction towards UE 112. Example of algorithms suitable for this purpose are those based on the concept of Signal to Leakage plus Noise Ratio (SLNR) described in the article by A. Tarighat, M. Sadek, A. H. Sayed, "*A Multi User Beamforming Scheme for Downlink MIMO Channels based on Maximizing Signal-to-Leakage Ratio*". University of California, ICASSP 2005. Conversely in case of a joint transmission scheme the precoding weights at the interfering cell $I_j$ are computed in order to maximize the antenna gain over the relevant direction towards the UE 112.

In a second embodiment, UE 112 reports an indicator correlated to the CSI; in this case UE implicitly reports the CSI. In case of implicit reporting, the CSI is preferably quantized by means of a codebook and the reported quantity is represented by an index, denoted as PMI (Precoding Matrix Index), of the best element to be picked up in the codebook. The implicit reporting reduces the CSI overhead at the price of a lower accuracy with respect to the explicit CSI reporting. Also in case of codebook based precoding the PMI selection done by the UE depends on the type of coordination scheme that is implemented in the network. In case of a pure interference rejection scheme the PMI is selected in order to minimize the power leakage between the interfering cell $I_j$ and UE 112. In this case the useful data are transmitted to UE 112 only by the serving cell. In case of a joint transmission scheme the PMI is selected in order to maximize the channel gain between the interfering cell $I_j$ and UE 112. In this case the useful data are transmitted by both the useful and the interfering cell by using a simple spatial multiplexing scheme or using more complex multi-cell Multi User MIMO (MU-MIMO) schemes.

According to the definition given above with reference to FIG. 3, the threshold $\Delta_t(k)$ is the minimum difference between the radio quality indicator of the serving cell and the same indicator measured for each interfering cell. When the difference of the indicators measured by the UE drops below the threshold, the coordination mechanism is activated.

A larger positive value of the threshold $\Delta_t(k)$ indicates that a larger number of interfering cells can be included in the interference rejection mechanism thus implicitly increasing the size of the coordination set for UE 112. In such a case also weak cells may be included by the algorithm with an increment of the signalling overhead and also of the QoS achievable by the user. However, in order to limit the overhead, in one embodiment the network defines a maximum size (CS) for the cooperation set. In this case only the CS-1 strongest interfering cells for which the threshold is exceed are included in the cooperation set of UE 112.

Conversely a small or negative value of the threshold limits the cases in which CoMP techniques are implemented, thus reducing the overhead generated by the UE and also reducing the correspondent level of achievable QoS. As a limit a very small or even negative value of the threshold disables completely the activation of the interference coordination scheme.

By dynamically controlling the threshold assigned to the different UEs, the network can therefore control the overhead on the backhauling links and at the same time the QoS offered to the users.

In the preferred embodiment, the cell radio quality measures ($Q_S, Q_{I_1}, \ldots Q_{I_j}$) performed by the user equipment are not reported to the network. In this case the network sets the threshold $\Delta_t(k)$ of each user in a way that can be defined as "open loop", by only exploiting the information available on the network side like user profile, service class (e.g. QCI), uplink load, backhauling load, UE capabilities. In an alternative embodiment the cell radio quality measures ($Q_S, Q_{I_1}, \ldots Q_{I_j}$) are reported by each user equipment to the network through uplink signalling. In this alternative embodiment the threshold is set by means of a suitable algorithm running on the eNodeB that exploit the reported measures and the available information on the network side. This alternative embodiment, defined as "closed loop", allows the definition of more complex algorithms for the control of the thresholds at the price of a larger uplink signalling load and delay.

From the above described preferred embodiments, the advantages of the present invention are clear.

It is also clear that the person skilled in the art can provide many changes to the embodiments above described without departing from the scope of the present invention as it results from the annexed claims.

As an example, the threshold can be set in different ways in order to take into consideration different factors and obtain different advantages.

In a first embodiment of the invention the threshold $\Delta_t(k)$ is related to the profile of the user stored in the HLR (Home Location Register). For example, a user with a higher profile (i.e. a gold or premium user) is configured by the network with a larger value of the threshold $\Delta_t(k)$ with respect to a user that has a lower profile.

In a second embodiment the threshold $\Delta_t(k)$ is related to the class of the service/bearer requested by the user. For example a user that requests a bearer with strict data rate and latency requirements (e.g. a conversational service with guaranteed bit rate or GBR) can be configured by the network with a larger value of the threshold $\Delta_t(k)$ with respect to another user that requests an interactive or a background service. In one embodiment, the network (and in particular the eNodeB) assigns a threshold value to a user based on the QoS Class Identifier (QCI), associated to a bearer by the cell; such a QCI is preferably characterized by priority, packet delay budget and acceptable packet loss rate. As an example, the network determines the Threshold to be assigned to the users based on the QCI defined in the 3GPP specification TS 23.203 V8.9.0 (2010-03), "Policy and charging control architecture", page 30. For completeness the table that lists the set of standardized QCIs is reported in Table 1 below.

TABLE 1

Standardized QoS Class Identifiers
(QCIs) for LTE (3GPP TS 23.203)

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

In this embodiment, access apparatuses, in particular eNodeBs of network 100, are provided with a mapping function that maps QCIs values on specific threshold values $\Delta_i(k)$, so as to assign to each UE a threshold $\Delta_i(k)$ at the bearer setup.

In a third embodiment the value of the threshold $\Delta_i(k)$ is related to the load of the uplink radio interface where the CoMP signalling is transmitted. In general a lower value of the threshold is configured as the uplink load increases. In this respect it is also possible to imagine a centralized algorithm in the base station that jointly controls the value of the threshold as a function of the uplink load for all the users served by the cells which are under the control of the eNodeB. For example the algorithm may start to decrease the threshold as the uplink load increases by defining for each user a priority level related to the QoS class and the service type.

In a fourth embodiment the threshold $\Delta_i(k)$ is related to the load over the backhauling links, where the load represents the fraction of capacity used in the backhauling links between the serving cell and the interfering cells (i.e. a load of 100% represents the full usage of the backhauling capacity). Preferably the load is estimated as an average over a sufficient time interval, preferably in the range from 10 ms to 900 ms, in order to smooth the fast fluctuation of the measure.

In a fifth embodiment the threshold $\Delta_i(k)$ is related to the UE capabilities. In particular the threshold $\Delta_i(k)$ depends on the interference rejection capabilities of the user equipment. For example a user equipment which has the hardware capabilities to perform the inter-cell interference cancellation can be configured with a lower value of the threshold because the benefits of the CoMP techniques may be partially or totally realized through signal processing algorithms implemented at the UE side. This mechanism provides a greater flexibility to the network operator that can effectively balance the interference rejection processing done at the network side with the one done at the UE side. In one embodiment, in order to define the threshold $\Delta_i(k)$ as a function of the UE capabilities, each serving cell requests to the core network an information on the UE capabilities. Such a request is preferably implemented by the serving cell during connection establishment: when UE authenticates in the network, it provides several data (like IMEI, IMSI and so on) to the network. These data are saved in the HLR or in other network databases. From these data, and in particular from the IMEI, the network can retrieve the type of equipment used by the user and determine its capabilities. In another embodiment, the serving cell requests to the UE its capabilities, in particular its interference rejection capabilities, and sets a corresponding radio quality threshold for the UE.

In a sixth embodiment the threshold is set as a function of a set $Q_{set} \triangleq \{Q_S, Q_{I_1}, \ldots Q_{I_j}\}$ of radio quality measures ($Q_S$, $Q_{I_1}, \ldots Q_{I_j}$) that are reported by the user equipments to the network through uplink signalling.

In a seventh embodiment a combination of two or more parameters selected among user profile, service class, uplink load, backhauling load, UE capability and radio quality measures ($Q_S, Q_{I_1}, \ldots Q_{I_j}$) is used by the network to determine the threshold for each user.

In general the threshold $\Delta_i(k)$ can be expressed as a function of multiple parameters that model the status of the network, the service usage, the user equipment characteristics, etc.

One possible mathematical expression that can be used by the network for the calculation of this threshold $\Delta_i(k)$ is shown below just as example $$\Delta_i(k) = \alpha_1 f_1(P) + \alpha_2 f_2(QCI) + \alpha_3 f_3(UL_{load}) + \alpha_4 f_4(B_{load}) + \alpha_5 f_5(UE_{cap}) + \alpha_6 f_6(Q_{set}) \quad (3)$$

where P is the user profile stored in the HLR (Home Location Register) and $f_1(\bullet)$ is a suitable mapping function. Similarly $f_2(\bullet)$ is a function that maps the QCI values related to the service/bearer requested by the user on the value of the threshold configured by the network to the user. Similarly, $f_3(UL_{load})$ is a function of the uplink load $UL_{load}$, $f_4(B_{load})$ is function of the backhauling load $B_{load}$, $f_5$ ($UE_{cap}$) is a function of the UE capabilities $UE_{cap}$ and $f_6(Q_{set})$ is a function of the set $Q_{set}$ of radio quality measures ($Q_S, Q_{I_1}, \ldots Q_{I_j}$) that are reported by the user equipments to the network through uplink signalling. The two functions $f_3(\bullet)$, $f_4(\bullet)$ permit to realize an automatic overhead control generated by the CoMP scheme because as the uplink signalling load or the backhauling load increase they act by reducing the value of the threshold.

In a similar way the function $f_5(\bullet)$ reduces the value of the threshold for user equipments provided with inter-cell interference rejection capabilities. The weight coefficients $\{\alpha_1, \ldots, \alpha_5, \alpha_6\}$ are used to weight the different contributions and can take two values $\{0, 1\}$ depending if a given characteristic is included or not in the threshold adaptation mechanism for the i-th user. In order to increase the system flexibility, the weight coefficients $\{\alpha_1, \ldots, \alpha_5, \alpha_6\}$ may take different values for different users.

Notwithstanding the above description has focused on methods for coordinating transmission of cells in a wireless communication system, it is clear that the invention is also directed to the equipments that are used to implement the methods. In particular, the invention is directed to a radio equipment (the access apparatus 111) comprising means for wireless communication with a user equipment 112 and means (e.g. the X2 interface) for communicating with a second radio equipment suitable to establish wireless communication with said user equipment (another access apparatus). The radio equipment according to the invention comprises means for transmitting a radio quality metric, in particular a metric defined on a per-user basis, to the UE for detecting an interference condition. Moreover, the radio equipment according to the invention comprises means for receiving a trigger signal from the user equipment (112), said trigger signal comprising an identifier of said second radio equipment. Radio equipment is then configured to coordinate transmission with said second radio equipment upon reception of the trigger signal.

As discussed above with reference to FIGS. 1 to 4, the radio equipment according to the invention is adapted to set a radio quality metric on a per-user basis. In particular, it is adapted to set a radio quality metric that depends on a parameter selected in the group of parameters comprising: user profile, service class, uplink load, backhauling load, radio quality measures made by the user equipment and user equipment's interference rejection capabilities.

The radio equipment can transmit the radio quality metric during connection establishment of the user equipment to the radio equipment, or when said user equipment is connected to the radio equipment.

In both cases, according to the preferred embodiment the radio equipment further comprises means for requesting to the UE information on its interference rejection capabilities and means for receiving user equipment's interference rejection capabilities information from the UE, so as to set said radio quality threshold based on the user equipment's interference rejection capabilities.

Figure 5:
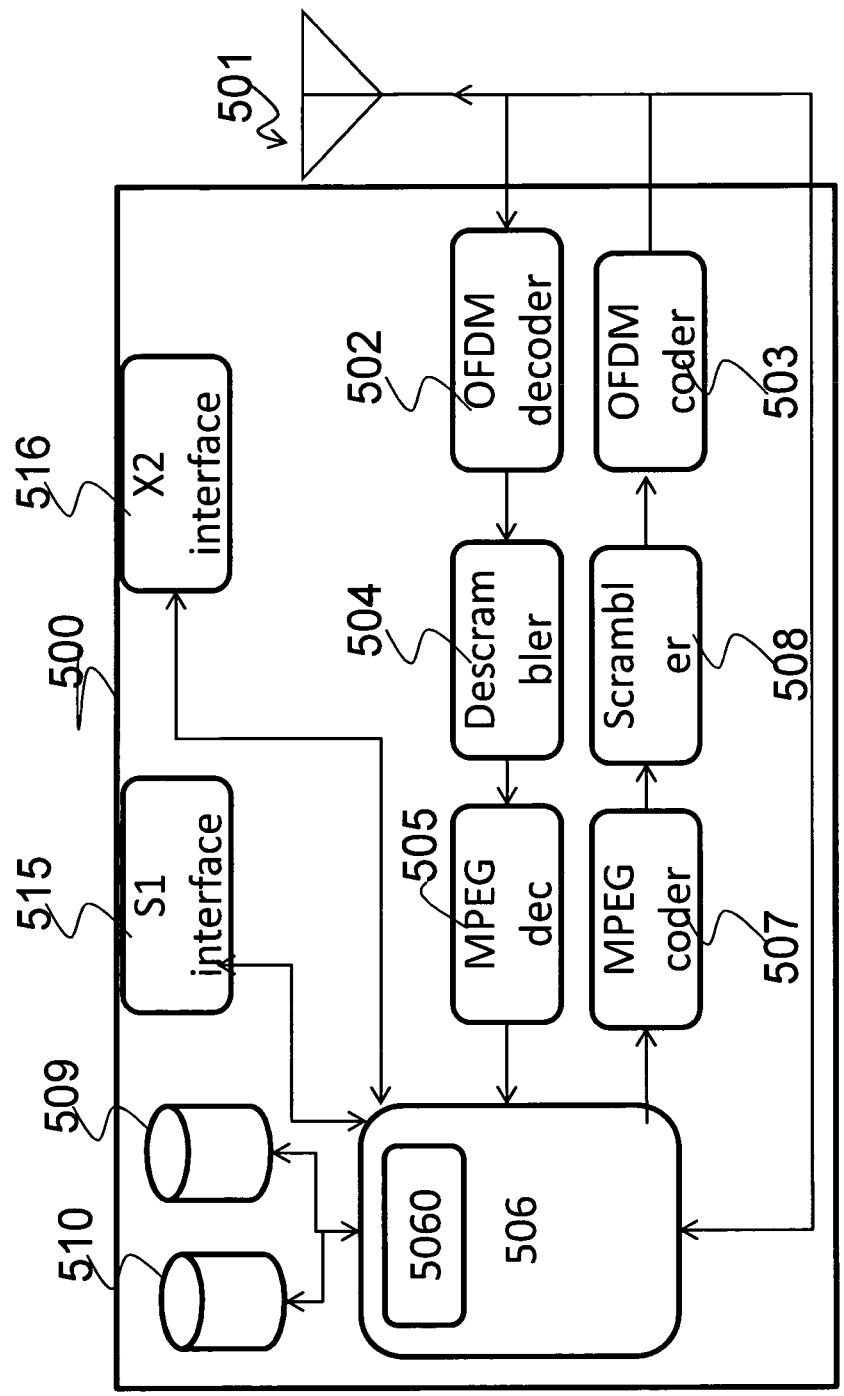
FIG. 5 is a block scheme of a radio equipment suitable to implement the method of the invention.

FIG. 5 shows a block scheme of a radio equipment 500 according to an embodiment of the present invention. Radio equipment 500 comprises an antenna 501 operatively connected to a receiving unit 502 and a transmitting unit 503.

Radio equipment 500 is adapted to communicate over an OFDM network, therefore receiving unit comprises an analogue to digital converter (ADC) followed by an OFDM decoder and eventually an error correction unit (e.g. a Forward Error Correction decoder). Receiving unit 502 receives data transmitted by a user equipment in an uplink channel and outputs data packets that may undergo further decoding processes like a descrambling process in a descrambling processing unit 504 and an MPEG decoding in an MPEG decoder 505. Data received are then processed by a control unit, preferably a microcontroller, 506.

Microcontroller 506 generates data to be transmitted in a downlink channel to a user equipment. This downlink data are MPEG coded in the MPEG coding unit 507 and than scrambled in a scrambling unit 508 in order to improve transmission reliability. Scrambled data are then processed by a transmission unit 503 that, in this embodiment is an OFDM coder.

Microprocessor 506 comprises a memory area 5060 storing all the necessary transmission and reception algorithms necessary to understand and to generate messages structured according to a predetermined communication protocol. In particular, microprocessor 506 is configured to generate a message comprising a quality metric, in particular a radio quality threshold, to be used by a user equipment to detect interference conditions. Such message, is preferably an RRC signalling message as described above with reference to FIGS. 1-4.

Radio equipment 500 comprises a user database 509 which stores information relative to the user equipment or to the user using the user equipment in connection with the radio equipment. As non limitative example, database 509 can store information on interference rejection capabilities of the user equipment or any other information relative to the user that can be used to define the value of the radio quality threshold as discussed above with reference to FIG. 1-4.

Radio equipment 500 also comprises a database 510 storing data relative to the QoS that shall be granted to a given communication between the user equipment and the radio equipment.

Microprocessor 506 retrieves data to be stored in databases 509 and 510 from messages transmitted from the user equipment and received via receiving unit 502, or by querying remote servers via a dedicated interface 515, e.g. an S1 interface for communication with the core network.

By querying databases 509 and 510, microprocessor 506 sets a threshold on a user per user basis or, better, on a connection per connection basis as described above. Other data necessary to set the radio quality threshold can be retrieved by the microcontroller by sending messages to user equipments or remote servers.

Memory area 5060 also comprises information for starting CoMP techniques.

When a user equipment transmits a trigger signal triggering the activation of coordinated transmission, this message is received by the receiving unit 502 that decodes it and provides it to the microcontroller 506 via descrambler 504 and MPEG decoder 505. Microcontroller 506 retrieves information of the interfering cells with which transmission shall be coordinated and start exchanging data with these cells as per method step 207 above described. For the communication with other radio equipments, radio equipment 500 is provided with a data interface, in particular an X2 interface, 516.

As described above with reference to steps 208-214, radio equipment 500 communicates with other radio equipments for coordinating transmission either at L2 or at L1 level.

In order to implement coordination at physical level (L1), microcontroller is connected to antenna 501 in order to modify the radiation field of the antenna.

Coordination at scheduling level, instead, is obtained by microcontroller by scheduling data to be transmitted within microcontroller 506. In one embodiment, in order to distribute calculation capacity of the radio equipment, the latter can be provided with a dedicated scheduler controlled by microprocessor 506.

In another aspect, the radio equipment further comprises means for transmitting to the UE information on frequency ranges wherein user equipment is requested to perform radio quality measures.

The invention is also directed to a user equipment (112) for use in a communication system (100). The user equipment comprises means for measuring quality of signals received from a plurality of transmitters (e.g. the access apparatuses 111) of the communication system, and means for transmitting a trigger signal to trigger coordinated transmission of at least two transmitters of said plurality of transmitters. The user equipment is configured to transmit said trigger signal when an interference condition is detected by comparing radio quality measures performed by the measuring means with a radio quality metric received by a radio equipment of the wireless communication system.

Figure 6:
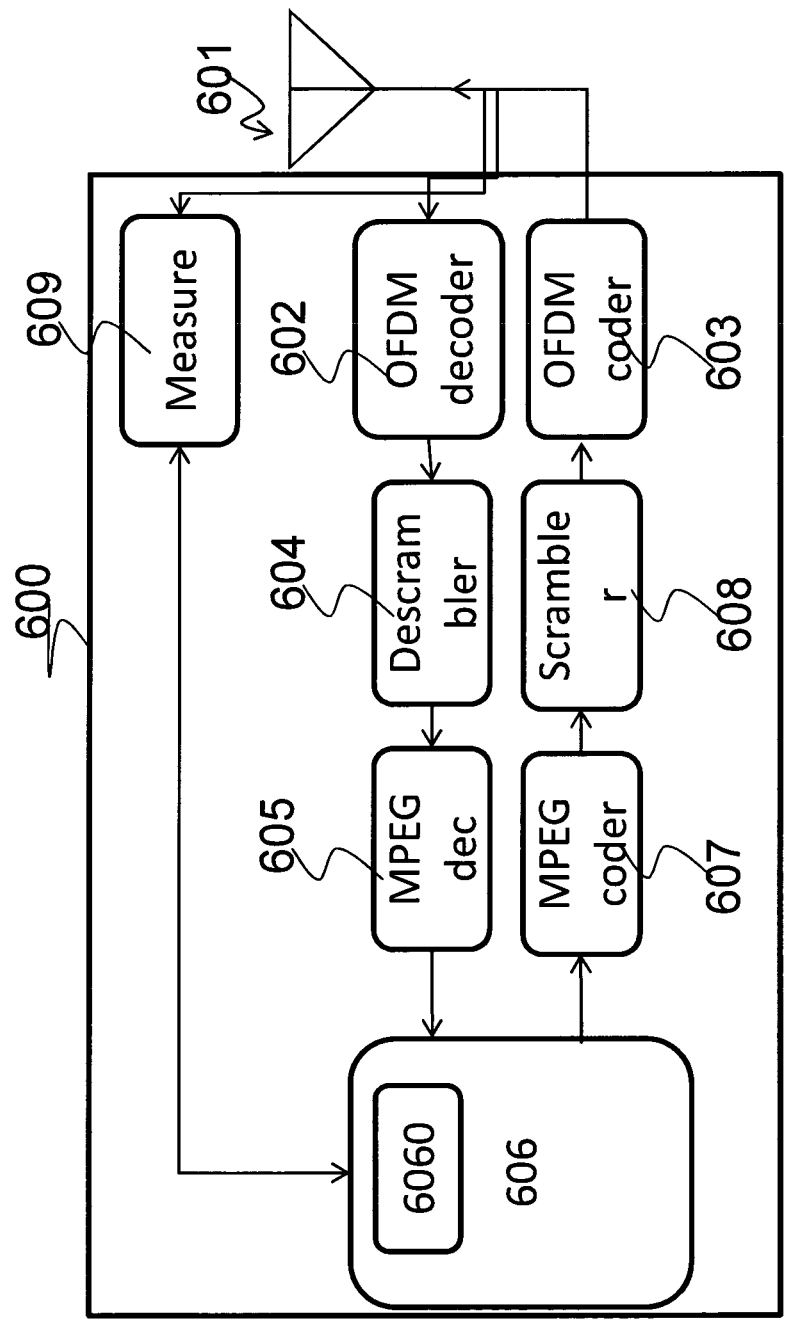
FIG. 6 is a block scheme of a user equipment suitable to implement the method of the invention.

FIG. 6 shows a block scheme of a user equipment 600 according to an embodiment of the present invention. User equipment 600 comprises an antenna 601 operatively connected to a receiving unit 602 and a transmitting unit 603.

User equipment 600 is adapted to communicate over an OFDM network, therefore receiving unit comprises an analogue to digital converter (ADC) followed by an OFDM decoder and eventually an error correction unit (e.g. a Forward Error Correction decoder). Receiving unit 602 therefore outputs data packets that may undergo further decoding processes like a descrambling process in a descrambling processing unit 604 and an MPEG decoding in an MPEG decoder 605. Data received are then processed by a control unit, preferably a microcontroller, 606.

Microcontroller 606 generates data to be transmitted in an uplink channel to a radio equipment of the network, e.g. an eNodeB. This uplink data are MPEG coded in the MPEG coding unit 607 and then scrambled in a scrambling unit 608 in order to improve transmission reliability. Scrambled data are then processed by a transmission unit 603 that, in this embodiment is an OFDM coder.

Microprocessor 606 comprises a memory area 6060 storing all the necessary transmission and reception algorithm necessary to understand and to generate messages structured according to a predetermined communication protocol.

Upon reception of a quality metric to be used for detecting interference conditions, microprocessor 606 performs quality measures as explained above with reference to FIGS. 1-4. To this end, user equipment 600 comprises a measuring unit 609 which is programmed to perform measurement of several different radio quality parameters, like Reference Signal Received Quality (RSRQ), Signal to Interference Ratio of Reference Signals (RS SINR) and the Reference Signals Received Power (RSRP). Measuring unit is adapted to perform wideband measures or narrowband measures.

Measuring unit is connected to microcontroller 606 preferably by an Ic2 bus wherein commands on the type of measure to be performed are transmitted from microcontroller 606 to measuring unit 609 and wherein measures performed are reported to the microcontroller 606 from the measuring unit 609. As an example, microcontroller 606 informs measuring unit 609 of the bands wherein measures are to be performed.

Microprocessor 606 uses data received from measuring unit 609 in order to detect interference conditions based on the received quality metric. Microprocessor than generates a report message that is preferably transmitted over a dedicated control channel to a radio equipment of a serving cell by means of the transmitting unit 603.

As clear from the above description of the method for coordinating transmission of a plurality of cells in a wireless communication system, in one embodiment the user equipment further comprises means for receiving information on specific frequency ranges wherein measures are to be performed. The user equipment shall therefore comprise measuring means adapted to perform quality measures in said specific frequency ranges. With reference to the embodiment of FIG. 6, microcontroller is adapted to extract information on the band wherein radio quality measures are to be performed from the data received via receiving unit 502, descrambler 504 and MPEG decoder 505. This information is then transmitted to the measuring unit 509 that performs the measures in the requested band.

In another embodiment, wherein the communication system provides services over a given transmission band, the user equipment comprises measuring means adapted to perform radio quality measures over the whole transmission band of the communication system, so as to have a good understanding of the interference condition over the whole band and allow the communication system to improve scheduling. In this embodiment, the measuring unit 609 of user equipment 600 should be adapted to perform such wideband measures.

Preferably, the user equipment is configured to perform said measures exploiting Synchronization Signals (SS) or Reference Signals (RS) transmitted by different radio equipments of the wireless communication system.

Finally, it is remarked that the invention is also directed to a wireless communication system (100) comprising a plurality of radio equipments according to any of claims 14 to 21 so as to implement coordinated transmission according to the methods above described.

The invention claimed is:

1. A method for coordinated transmission in a plurality of cells of a wireless communication system, the plurality of cells including a serving cell, neighboring cells and interfering cells among the neighboring cells, the method comprising:
    receiving a radio quality metric from the serving cell of the wireless communication system, the radio quality metric dynamically set by the serving cell on a per-user equipment basis:
    performing, by a user equipment, a cell search independent of measurement configuration information and a candidate cell list from the serving cell;
    measuring, by the user equipment, a plurality of quality of signals received from the plurality of cells of the wireless communication system based on the cell search;
    calculating, by the user equipment, a plurality of differences between a quality of signal from the serving cell and quality of signals from each of the neighboring cells, each difference of the plurality of differences being between the quality of signal from the serving cell and a quality of signal from a corresponding neighboring cell;
    comparing, by the user equipment, the plurality of differences with the radio quality metric;
    determining, by the user equipment, activation of coordinated transmission of the plurality of cells when the user equipment detects an interference condition between signals received from any one of the plurality of cells according to a result of comparing the plurality of differences with the radio quality metric;
    triggering, by the user equipment, transmission from only the serving cell of the plurality of cells, without coordinated transmission of at least two cells of the plurality of cells, when the user equipment does not detect the interference condition between signals received from any one of the plurality of cells; and
    detecting, by the user equipment, the interference condition based on the radio quality metric and triggering, by the user equipment, coordinated transmission by transmitting a trigger signal to at least a cell of the plurality of cells.

2. A method according to claim 1, wherein the radio quality metric depends on a parameter selected in the group of parameters comprising: user profile, service class, uplink load, backhauling load, radio quality measures made by the user equipment, and user equipment's interference rejection capabilities.

3. A method according to claim 1, wherein the plurality of cells coordinate transmission by scheduling transmission.

4. A method according to claim 1, wherein the cells coordinate transmission at a physical level.

5. A method according to claim 4, wherein the cells coordinate transmission by controlling an emission field of at least an antenna of the plurality of cells.

6. A method according to claim 4, wherein before coordinating transmission at the physical level, the plurality of cells exchange information to try coordinating transmission by scheduling transmission, and wherein coordination at the physical level is exchanged only if coordination by scheduling transmission is not possible.

7. A method according to claim 1, wherein the radio quality metric is a radio quality threshold and wherein the user equipment:
    when there is at least one interfering cell, transmits to the serving cell an identifier of the at least one interfering cell, the at least one interfering cell being one of the neighboring cells whose measured radio quality differs from the radio quality of the serving cell by less than the radio quality threshold, determines to cause the serving cell to coordinate transmission with the interfering cells to reduce interference experienced by the user equipment, and when there is no neighboring cell whose measured radio quality differs from the radio quality of the serving cell by less than the radio quality threshold, transmits only the radio quality of the serving cell to cause the serving cell to provide transmission to the user equipment without coordinated transmission with any neighboring cells.

8. A method according to claim 7, wherein the radio quality measures are performed over a whole transmission band.

9. A method according to claim 7, wherein the radio quality measures are performed over specific ranges of the transmission band, the specific ranges being communicated to the user equipment by the network, and comprising one or more frequency bands that will be allocated to the user equipment.

10. A method according to claim 7, wherein the radio quality measures are performed over specific ranges of the transmission band, the specific ranges comprising the band allocated to the user equipment when the threshold is communicated to the user equipment.

11. A method according to claim 1, wherein the radio quality metric is transmitted during connection establishment of the user equipment to the network.

12. A method according to claim 1, wherein the radio quality metric is transmitted when the user equipment is connected to the network.

13. A method according to claim 1, wherein the trigger signal is a report message comprising at least one CoMP activation bit and a report of radio quality measures carried out by the user equipment to detect the interference condition, the report message being transmitted by the user equipment using a logical dedicated control channel at Radio Link Control level and/or using a signalling radio bearer at Radio Resource Control level.

14. A radio equipment comprising:
circuitry configured to operatively connect to a receiving unit and to a transmission unit for wireless communication with a user equipment; and
an interface for communicating with a second radio equipment configured to establish wireless communication with the user equipment,
wherein the circuitry is configured to dynamically set a radio quality metric on a per-user equipment basis and to transmit the radio quality metric via the transmission unit to the user equipment for detecting an interference condition;
the circuitry is configured to receive a trigger signal from the user equipment via the receiving unit when the user equipment detects the interference condition between signals received from the second radio equipment and determines activation of coordinated transmission of the second radio equipment by calculating difference between a quality of signal from the radio equipment and a quality of signal from the second radio equipment and comparing the difference with the radio quality metric, the trigger signal comprising an identifier of the second radio equipment, and to receive a signal that does not contain the identifier of the second radio equipment when the user equipment does not detect the interference condition from the second radio equipment; and
the radio equipment further comprising:
a data interface, operatively connected to the circuitry, for communicating with the second radio equipment, the circuitry being configured to coordinate transmission with the second radio equipment upon reception of the trigger signal, and the circuitry does not coordinate transmission with the second radio equipment when the circuitry receives the signal that does not contain the identifier of the second radio equipment; and
at least one database comprising information relative to a user of the user equipment, whereby the circuitry is further configured to set the radio quality metric on a per-user basis based on information stored in the at least one database.

15. A radio equipment according to claim 14, wherein the radio equipment further comprises an antenna connected to the transmission unit and to the circuitry, and wherein the circuitry is configured to coordinate transmission with the second radio equipment by scheduling data to be transmitted by the transmission unit and to control one of a radiation field of the antenna and a power of the signals output by the transmission unit, so that coordination with the second radio equipment is implemented at a physical layer in case coordination at a layer 2 is not possible.

16. A radio equipment according to claim 14, wherein the radio quality metric depends on a parameter selected in the group of parameters comprising: user profile, service class, uplink load, backhauling load, radio quality measures made by the user equipment, and user equipment's interference rejection capabilities.

17. A radio equipment according to claim 14, wherein the circuitry is further configured to:
request to the user equipment information on its interference rejection capabilities via the transmission unit; and
receive user equipment's interference rejection capabilities information from the user equipment via the receiving unit,
so as to set the radio quality threshold based on the user equipment's interference rejection capabilities.

18. A radio equipment according to claim 14, wherein the trigger signal is a report message comprising at least one CoMP activation bit and a report of radio quality measures carried out by the user equipment to detect the interference condition, the circuitry being configured to receive the report message via a logical dedicated control channel at Radio Link Control level and/or via a signalling radio bearer at Radio Resource Control level.

19. A radio equipment according to claim 14, wherein the circuitry is configured to transmit the radio quality metric during connection establishment of the user equipment to the radio equipment.

20. A radio equipment according to claim 14, wherein the circuitry is configured to transmit the radio quality metric when the user equipment is connected to the radio equipment.

21. A user equipment for use in a wireless communication system including a plurality of radio equipments which consist of a serving radio equipment, neighboring radio equipments and interfering radio equipments among the neighboring radio equipments, the user equipment comprising:
circuitry configured to
receive a radio quality metric from the serving radio equipment of the communication system, the radio quality metric dynamically set by the serving radio equipment on a per-user equipment basis;
perform a cell search independent of measurement configuration information and a candidate cell list from the serving cell;
measure quality of signals received from a plurality of radio equipments of the communication system based on the cell search;

calculate a plurality of differences between a quality of signal from the serving radio equipment and quality of signals from each of the neighboring radio equipments, each difference of the plurality of differences being between a quality of signal from the serving radio equipment and a quality of signal from a corresponding neighboring radio equipment;

compare the plurality of differences with the radio quality metric;

determine activation of coordinated transmission of the plurality of radio equipments when the user equipment detects an interference condition between signals received from any one of the plurality of cells according to a result of comparing the plurality of differences with the radio quality metric;

operatively connect to a transmission unit, the circuitry configured to generate a trigger signal and to transmit the trigger signal to a radio equipment of the plurality of radio equipments via the transmission unit, the trigger signal configured to trigger coordinated transmission of at least two equipments of the plurality of radio equipments;

transmit the trigger signal when the interference condition is detected by comparing the plurality of differences with the radio quality metric received from the serving radio equipment of the wireless communication system; and transmit a signal that causes transmission from only one of the plurality of radio equipments, without coordinated transmission of at least two equipments of the plurality of radio equipments, when the user equipment does not detect the interference condition from any one of the plurality of radio equipments.

22. A user equipment according to claim 21, wherein the trigger signal is a report message comprising at least one CoMP activation bit and a report of the quality measures, the report message being transmitted using a logical dedicated control channel at Radio Link Control level and/or using a signalling radio bearer at Radio Resource Control level.

23. A user equipment according to claim 21, wherein the quality metric is a quality threshold and wherein the user equipment is configured to extract the quality threshold from a RRCConnectionSetup message at connection setup and/or from a RRCConnectionReconfiguration message.

24. A user equipment according to claim 21, wherein the measures are performed exploiting Synchronization Signals or Reference Signals transmitted by different radio equipments of the wireless communication system.

25. A wireless communication system comprising a plurality of radio equipments according to claim 14.

26. A method according to claim 1, wherein the trigger signal includes a notifying bit for the activation of coordinated transmission of the plurality of cells determined by the user equipment.

27. A user equipment according to claim 21, wherein the trigger signal includes a notifying bit for the activation of coordinated transmission of the plurality of radio equipments determined by the user equipment.

* * * * *